United States Patent
Simpson

(10) Patent No.: US 7,145,685 B2
(45) Date of Patent: Dec. 5, 2006

(54) METHOD AND APPARATUS FOR ELECTRONIC COLLATION

(75) Inventor: Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1306 days.

(21) Appl. No.: 09/728,690

(22) Filed: Dec. 1, 2000

(65) Prior Publication Data

US 2002/0066989 A1     Jun. 6, 2002

(51) Int. Cl.
    G06K 15/00    (2006.01)
    H04N 1/00     (2006.01)

(52) U.S. Cl. ............... 358/1.18; 358/400; 358/1.15

(58) Field of Classification Search ............. 358/1.16, 358/1.12, 1.13, 1.15, 1.5, 1.14, 1.18, 400, 358/404; 399/8, 9, 361, 12, 19, 10
    See application file for complete search history.

(56) References Cited

U.S. PATENT DOCUMENTS

| | | | | |
|---|---|---|---|---|
| 4,099,254 A * | 7/1978 | Andrews et al. | .............. | 355/24 |
| 5,087,979 A * | 2/1992 | Schaertel | .................... | 358/296 |
| 5,528,734 A * | 6/1996 | Sanchez | .................... | 358/1.16 |
| 5,768,488 A * | 6/1998 | Stone et al. | ............... | 358/1.18 |
| 5,970,228 A * | 10/1999 | Nezu | .......................... | 713/200 |
| 6,148,164 A * | 11/2000 | Shima | ........................ | 399/82 |
| 6,317,193 B1 * | 11/2001 | Funahashi | .................... | 355/40 |
| 6,466,326 B1 * | 10/2002 | Shima | ....................... | 358/1.12 |
| 6,496,278 B1 * | 12/2002 | Tamura et al. | ............ | 358/1.16 |
| 6,690,477 B1 * | 2/2004 | Nakagiri et al. | ........... | 358/1.12 |
| 2002/0089684 A1 * | 7/2002 | Barry et al. | ............... | 358/1.14 |

* cited by examiner

Primary Examiner—Jerome Grant

(57) ABSTRACT

A method and apparatus facilitate printing N collated copies of a document on a printer, where N is an integer greater than one. The method detetermines whether the printer has sufficient capacity to print N collated copies of the document. If the printer has insufficient capacity to store one copy of the document, then the method performs the following step N times: sending a single copy of the document to the printer. The capacity may be memory to store one copy of the document in print ready form. The apparatus comprises a memory, a spooler connected to the memory, a status agent and a control logic connected to the spooler and the status agent. The memory is configured to store the document. The spooler is configured to send an outgoing print job to the printer. The status agent is configured to receive from the printer information regarding whether the printer has sufficient capacity to collate the document. The control logic controls the spooler on the basis of this information.

17 Claims, 3 Drawing Sheets

METHOD AND APPARATUS FOR ELECTRONIC COLLATION

FIELD OF THE INVENTION

This invention relates generally to the production of multiple copies of a document, and more particularly to electronic collation.

BACKGROUND OF THE INVENTION

Collation is the process of sorting pages of multiple copies of a document so that the pages of each copy are contiguous and ordered (i.e. all the pages of copy one are contiguous, all the pages of copy two are contiguous, and so on). Traditionally, collation has been performed mechanically using output bins or original re-feeding. In the former case, as each page of the original is copied, each copy is placed in a different bin. When the required number of copies of a page has been made or the number of available bins has been exhausted, the next page is copied in a similar fashion. This process is continued until all pages have been copied. Mechanical output bin collation suffers from a number of limitations. First, the number of collated copies that can be printed cannot exceed the number of bins available. Second, the number of pages in a single copy cannot exceed the capacity of an output bin.

The mechanical limitations associated with the use of sorting bins can be overcome by re-feeding the original pages once for each copy. Using this technique, collated copies are stacked upon each other in a single output bin. Although this technique avoids the problems associated with the use of multiple output bins, it introduces another serious shortcoming: performance. Each page of the original must be fed into the hardcopy device multiple times. This process requires extra time and introduces additional potential for mechanical failure. In contrast, when using output bins to collate, it is only necessary to feed each page of the original once, thus reducing the potential for mechanical failure and avoiding the time required to repeatedly feed the original pages.

In digital hardcopy devices, the mechanical and performance problems associated with re-feeding original pages have been largely eliminated. Rather than physically re-feeding original pages, each original page is digitized—a process by which the page information is converted into a digital form suitable for use in a digital computing system—and recorded into storage (e.g., RAM (random access memory) or disk) for subsequent use. As each copy is produced, the pages of the original are "digitally re-fed" by retrieving them from storage; the digital version of original page is used to produce a copy of that original page. Because the original pages are not physically re-fed, the risk of mechanical failure is drastically reduced. Furthermore, performance is dramatically improved because the digital version of the original page can typically be retrieved much faster than the original page can be mechanically re-fed. This process is henceforth referred to as "electronic collation" or "digital collation."

Printers, being digital hardcopy devices, can also take advantage of digital collation. Unlike copiers, printers receive the original already in digital form. Typically, this digital form is translated within the printer into another digital form referred to as "print ready." When in print ready form, original pages can be retrieved and printed at a speed that at least matches that of the print engine. In order to produce collated copies, printers will record the print ready form of the original into storage for subsequent use. Similar to copiers, as each copy is produced, the print ready form of the pages of the original are digitally re-fed by retrieving them from storage; the print ready digital form of each original page is used to produce a printout of that original page.

Digital collation works well, provided the digital hardcopy device has adequate digital storage. If the amount of storage is not adequate to store all of the original pages inprint ready form, digital collation fails. Rather than faithfully printing the number of collated copies requested, only a single copy is typically printed; it is not possible to print additional copies because it is not possible to store the original in its entirety.

With hardcopy devices that utilize disk drives to store the original pages in digital form, exhausting the amount of available storage is rare. However, very few hardcopy devices (less than 10%) have a hard disk installed. For the majority of printers (e.g., the HEWLETT-PACKARD (TM) LASERJET (TM) model 4050 printer), digital collation is performed using RAM storage. Because of the relatively high cost of RAM per megabyte in comparison to hard disk storage, the amount of storage that is provided through RAM is severely limited. This drastically increases the chances that available storage will be exhausted when using digital collation to print.

When available storage is exhausted during a digital collation operation, there is currently no reliable way to recover or to even notify the end-user who originated the print job. This means, for example, that if a reasonably large document is printed using digital collation, only a single copy of the document will print—without warning or explanation that the additional copies did not print.

SUMMARY OF THE INVENTION

In one respect, the invention is a method for printing N collated copies of a document on a printer, where N is an integer greater than one. The method determines whether the printer has sufficient capacity to print N collated copies of the document. If the printer has insufficient capacity to store one copy of the document, then the method performs the following step N times: sending a single copy of the document to the printer. The capacity may be memory to store one copy of the document in print ready form.

In another respect, the invention is a computer readable medium on which is embedded a program that performs the method described above.

In yet another respect, the invention is an apparatus for processing an incoming print job requesting N collated copies of a document on a printer, where N is an integer greater than one. The apparatus comprises a memory, a spooler connected to the memory, a status agent and a control logic connected to the spooler and the status agent. The memory is configured to store the document. The spooler is configured to send an outgoing print job to the printer. The status agent is configured to receive from the printer information regarding whether the printer has sufficient capacity to collate the document. The control logic controls the spooler on the basis of this information.

In comparison to known prior art, certain embodiments of the invention are capable of achieving certain advantages, including some or all of the following: (1) printing of the correct number of copies in almost all cases transparently to the user; (2) automatic detection of and compensation for limitations due to inadequate storage capacity; and (3) relaxation of device memory requirements, allowing, for example, production of printers with less expensive RAM memory without sacrificing digital collation performance.

Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
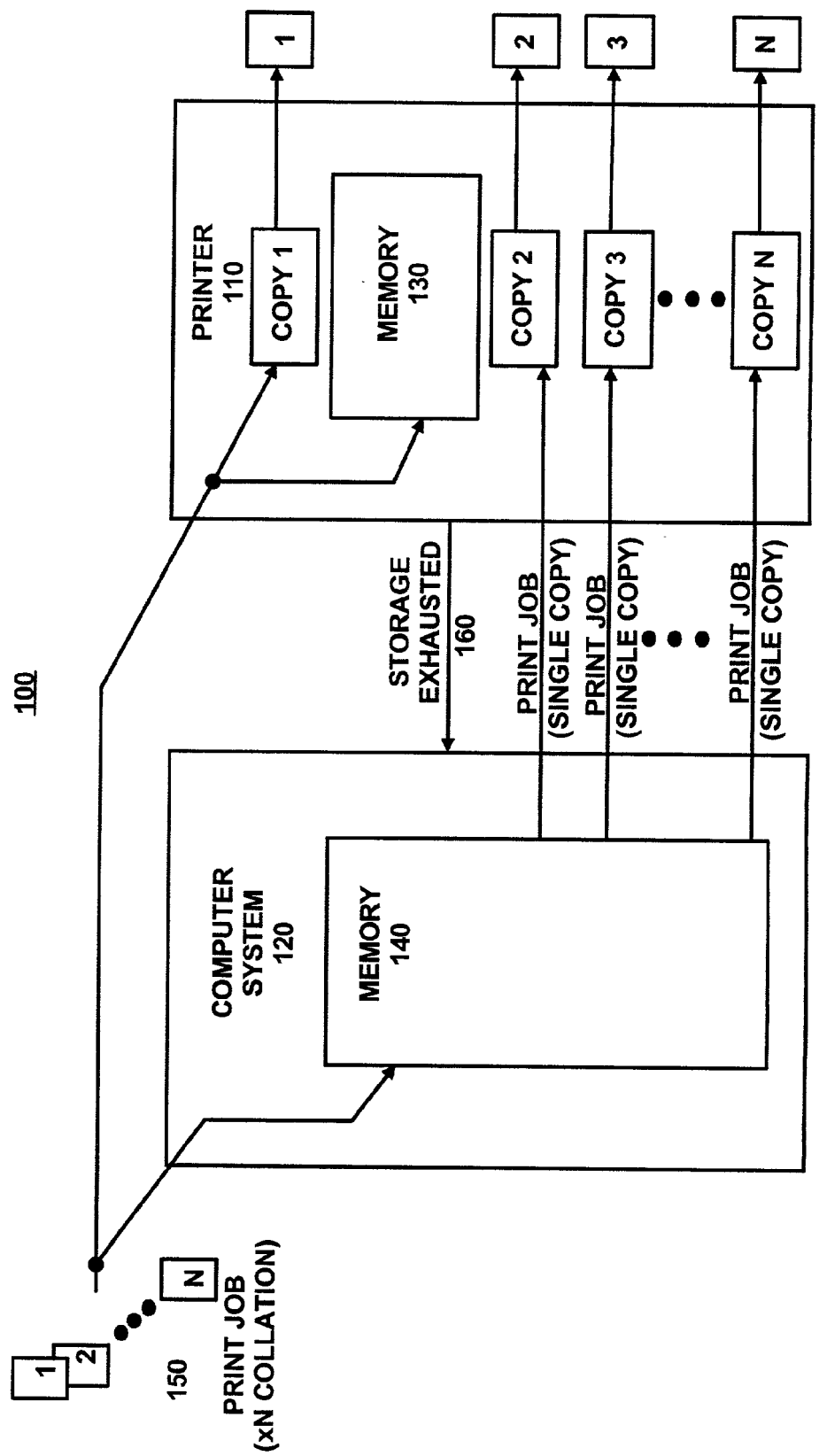
FIG. 1 is an interaction diagram of devices and their actions, according to one embodiment of the invention.

FIG. 1 is an interaction diagram of a system 100 comprising a printer 110 and a computer system 120 as well as object flow between them, according to one embodiment of the invention. The printer 110 is capable of performing digital collation and includes a memory 130 for this purpose. The memory 130 may be RAM, but this need not be the case. The memory 130 may be shared with other print functions. The system 100 facilitates digital collation whenever the capacity of the memory 130 is overrun, regardless of the nature or type of the memory 130. The printer 110 may contain other memories for other purposes (e.g., buffers for incoming print jobs, resident program memory, font memory, etc.); the memory 130 typically stores the a document for collation in print ready form. The computer system 120 includes a memory 140 that is typically much larger than the memory 130 in the printer 110. When the size of a document for printing is too large to fit in the memory 130, the document can still be printed with collation by storing the document in the memory 140, as described in greater detail below.

FIG. 1 depicts the print job 150 originating from a source (notshown) and going to both the printer 110 and the computer system 120. The print job 150 comprises a document as well as an instruction for N-wise collation (i.e., N collated copies of the document). In most embodiments, the document in the print job 150 is not in print ready form, although that need not be the case; in those embodiments, the computer system 120 and/or the printer 110 may convert the document to print ready form. Although not depicted as such, the originator of the print job 150 can be the computer system 120 itself. In yet another alternative, the print job 150 may pass through the computer system 120 before reaching the printer 110; in other words, the print job 150 may pass serially to the computer system 120 then the printer 110, rather than in parallel, as shown. The computer system 120 may be a print server on a computer network.

The object flow in FIG. 1 will now be described. First, the computer system 120 and the printer 110 receive the print job 150 with a collation copy count of N. The computer system 120 stores a copy of the document in its memory 140. The printer begins printing copy 1 of the document while storing a copy of the document in its memory 130 for later digital re-feeding after copy 1 concludes printing. If the memory 130 is inadequate to store the document, then an indication of storage exhaustion 160 is transmitted from the printer 110 to the computer system 120. Upon receipt of the indication of storage exhaustion 160, the computer system 120 sends the document to the printer 110 N-1 times, each one as a single copy print job.

Figure 2:
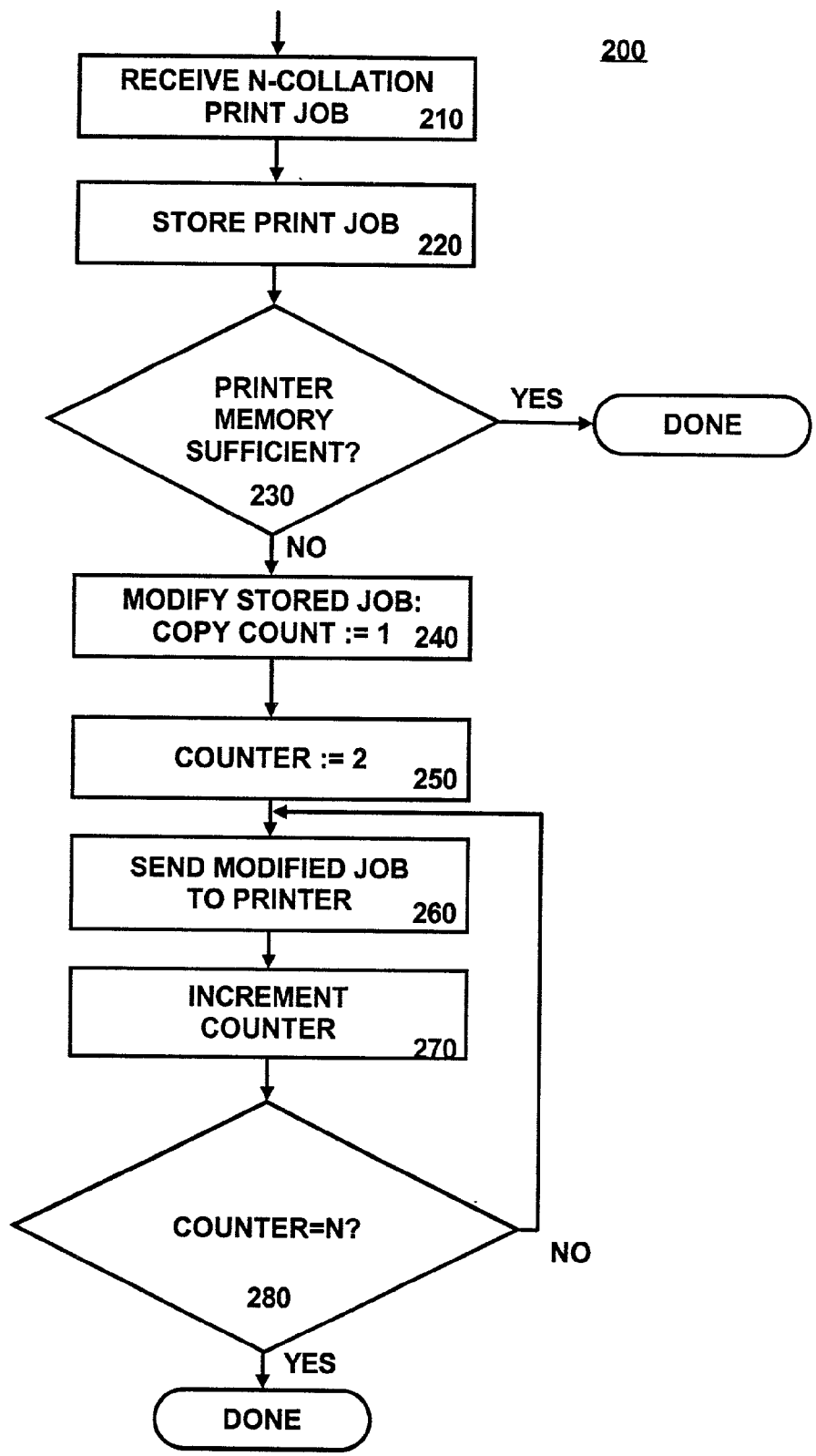
FIG. 2 is a flowchart of a method according to an embodiment of the invention.

FIG. 2 is a flowchart of a method 200 according to an embodiment of the invention. The method 200 is typically performed by the computer system 120. The method 200 begins when an N-collation print job (i.e., a job requesting N collated copies of a document to be produced on a destination printer (e.g., the printer 110)) is received (210). The print job is then stored (220). Next, the method 200 tests (230) whether the printer 110 has sufficient memory for collation of the job. Typically, sufficient memory is that required to store one copy of the document in print ready form. If the printer 110 has sufficient memory, the method 200 terminates after the testing step 230. On the other hand, if the printer's (110) memory is insufficient, then the method 200 modifies (240) the print job by overwriting the copy count to be one and proceeds to print N-1 single copies of the document, assuming that the printer 110 has already received the original print job and will produce one copy of the document as a result.

To produce the extra N-1 single copies of the document, the method 200 initializes (250) a counter variable to be two. The method 200 then repeats a loop by sending (260) the modified job to the printer 110, incrementing (270) the counter variable and testing (280) whether the counter variable equals N, in which case the method 200 terminates.

The testing step 230 for determining whether the printer's memory is sufficient will now be described in greater detail. According to one implementation, the printer 110 affirmatively reports that it's memory is sufficient. According to another implementation, the computer system 120 waits for the printer 110 to report that its memory is insufficient. While awaiting this bad news, the computer system 120 checks whether the first copy of the document has completed printing. If the first copy has completed printing and the printer has not yet reported that its memory is insufficient, then the printer very likely has adequate storage capacity and the computer system 120 so concludes. The computer system 120 can prompt the printer 110 to report on its memory status in a variety of ways. According to one technique, the computer system 120 polls the printer by querying a PML (print management language) or SNMP (simple network management protocol) object, depending upon the nature of the connection between the printer 110 and the computer system 120. PML is a protocol for communicating with directly connected (e.g., parallel or serial) peripherals, as opposed to networked peripherals. PML is similar to SNMP, which is used with network connected devices instead.

Another technique for prompting the printer 110 to report its memory status is described in commonly assigned U.S. patent application Ser. No. 09/393,215, entitled "Method and Apparatus for Establishing Two-Way Communication with a Remote Printer," filed Sep. 9, 1999, which is hereby incorporated by reference. According to this technique, the computer system 120 sends to the printer 110 a print job, in which is embedded a modified PJL (print job language) SOCKETPING command directing the printer to send job status information to a specific network address.

Although the testing step 230 preferably determines whether the printer 110 has adequate storage capacity to perform digital collation, the testing step 230 can alternatively or additionally check for other capacity inadequacies (e.g., processing power, other hardware deficiencies, or the presence of a digital collation feature at all). In other words, the testing step 230 can generally determine adequate capacity in a broad sense, not just storage capacity.

Figure 3:
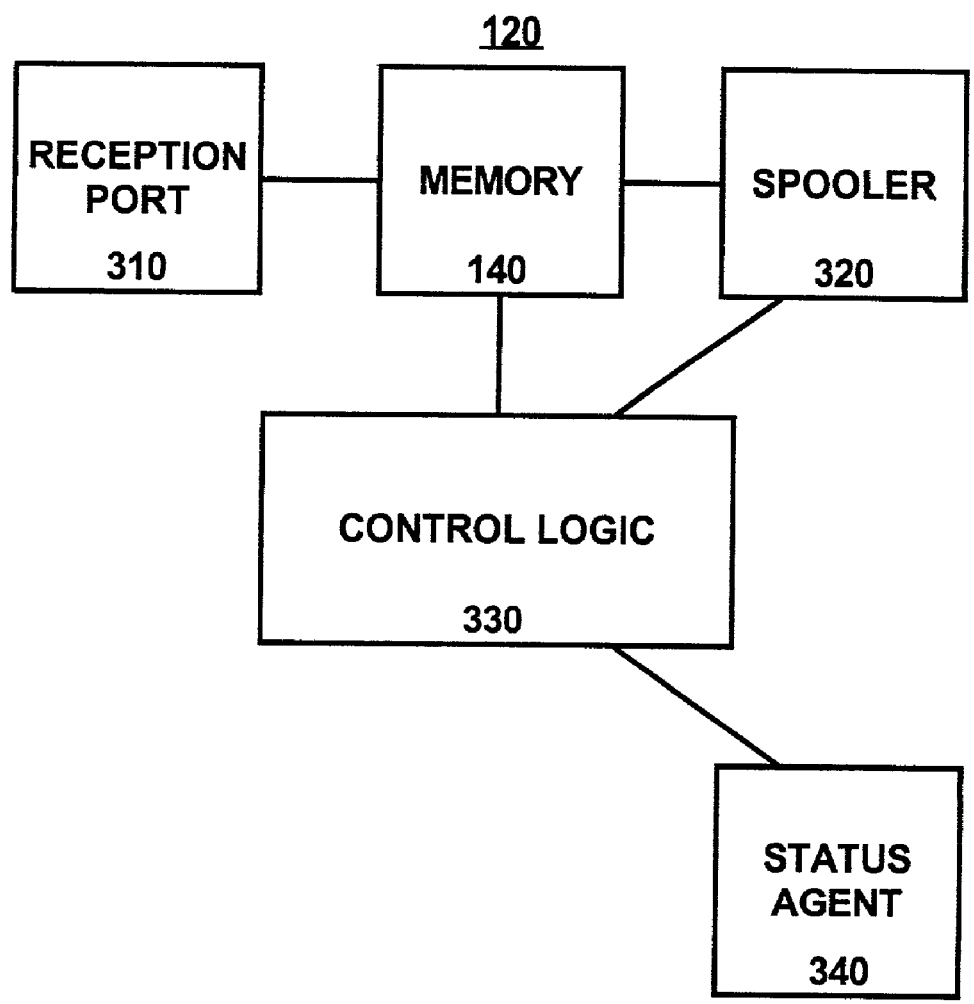
FIG. 3 is a block diagram of component modules according to one embodiment of the invention.

FIG. 3 is a block diagram of pertinent component modules within the computer system 120, according to one embodiment of the invention. The pertinent component modules include a reception port 310, the memory 140, a spooler 320, a control logic 330 and a status agent 340. The reception port 310 performs the receiving step 210, receiving an incoming print job. Of course, the reception port 310 and the receiving step 210 are not present when the print job originates at the computer system 120. The memory 140 stores the print job, as already described. The spooler 320 sends any print jobs to the printer 110. The spooler 320 can forward the original print job to the printer 110 if necessary, as would be the case when, unlike the case shown in FIG. 1, the original print job is not independently sent to the printer 110 along a parallel path. The spooler 320 also sends modified jobs to the printer 110 as needed. The status agent 340 performs the testing step 230 to determine memory status of the printer 110. The control logic 330 controls and coordinates the operation of the other components. For example, the control logic 330 may perform the modification step 240, the initialization step 250, the sending step 260, the incrementing step 270 and the testing step 280.

The spooler 320 and the status agent 340 are preferably subprograms called by the control logic 330, which can be a main program. Alternatively, the spooler 320 and the status agent 340 can be integrated into the control logic 330. Other integration and rearrangements of functionality are possible, as one skilled in the art would appreciate. Although software is preferred, some or all of the spooler 320, the control logic 330 and the status agent 340 could be hardware or firmware modules. Furthermore, the method 200, apart from any particular architecture such as the one shown in FIG. 3, can be implemented by program modules, whether software, firmware, hardware or some combination. Software modules can exist in a variety of forms both active and inactive, including source code, object code, executable code or other formats. Hardware modules can take the form of physical devices or hardware description language (HDL) files. Software files or HDL files can be embodied on a computer readable medium, which include storage devices and signals, in Compressed or uncompressed form. Exemplary computer readable storage devices include conventional computer system RAM, ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system can be configured to access, including signals downloaded through the Internet or other networks. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for printing N collated copies of a document on a printer, N being an integer greater than one, the method comprising:

providing a computer and a printer, the computer distinct from and coupled in data communication with the printer;

receiving a document at the computer and the printer, the document including a request to print N collated copies of the document;

determining at the computer whether the printer has capacity to print N collated copies of the document; and if it is determined that the printer has insufficient capacity, then sending a modified version of the document from the computer to the printer (N-1) times, wherein the modified version of the document includes a request to print one copy of the document.

2. The method of claim 1 wherein the capacity is a memory capacity.

3. The method of claim 2 wherein the capacity is a memory capacity to store one copy of the document in a print ready form.

4. The method of claim 1 further comprising:

storing a copy of the document.

5. The method of claim 1 wherein the determining step comprises:

awaiting receipt from the printer of a message regarding a sufficiency of the printer's capacity.

6. The method of claim 5 wherein the message regarding the sufficiency of the printer's capacity is initiated by the printer.

7. The method of claim 5 wherein the determining step further comprises:

detecting when a first copy of the document has been printed by the printer; and if the first copy of the document has been printed by the printer before receipt from the printer of an indication that the printer's capacity is insufficient, then concluding that the printer's capacity is sufficient.

8. The method of claim 5 wherein the awaiting step comprises:

polling the printer.

9. The method of claim 8 wherein the polling step comprises:

querying a PML object.

10. The method of claim 8 wherein the polling step comprises:

querying an SNMP object.

11. The method of claim 8 wherein the polling step comprises:

embedding a status request in a print job; and sending the print job to the printer.

12. A computer readable medium on which is embedded a computer program, the program comprising one or more instructions for performing a method of printing N collated copies of a document on a printer, N being an integer greater than one, the method comprising:

receiving a document at a computer system, the document including a request to print N collated copies of the document;

determining at the computer system whether the printer has capacity to print N collated copies of the document; and if the printer has insufficient capacity, then sending a modified version of the document from the computer system to the printer (N-1) times, wherein the modified version of the document includes a request to print one copy of the document.

13. The computer readable medium of claim 12 wherein the capacity is a memory capacity.

14. The computer readable medium of claim 13 wherein the capacity is a memory capacity to store one copy of the document in a print ready form.

15. The computer readable medium of claim 12 further comprising:

storing a copy of the document.

16. The computer readable medium of claim 12 wherein the determining step comprises:

awaiting receipt from the printer of a message regarding the sufficiency of the printer's capacity.

17. The computer readable medium of claim 16 wherein the awaiting step comprises:

polling the printer.

* * * * *